(12) United States Patent
Pawluczyk

(10) Patent No.: US 6,788,849 B1
(45) Date of Patent: Sep. 7, 2004

(54) VOLUME OR STACKED HOLOGRAPHIC DIFFRACTION GRATINGS FOR WAVELENGTH DIVISION MULTIPLEXING AND SPECTROSCOPY

(75) Inventor: Romuald Pawluczyk, Conestogo (CA)

(73) Assignee: CME Telemetrix Inc., Waterloo (CA)

( * ) Notice: Subject to any disclaimer, the term of this patent is extended or adjusted under 35 U.S.C. 154(b) by 0 days.

(21) Appl. No.: 10/130,078

(22) PCT Filed: Nov. 14, 2000

(86) PCT No.: PCT/CA00/01318
§ 371 (c)(1),
(2), (4) Date: Sep. 23, 2002

(87) PCT Pub. No.: WO01/37014
PCT Pub. Date: May 25, 2001

Related U.S. Application Data
(60) Provisional application No. 60/165,309, filed on Nov. 12, 1999.

(51) Int. Cl.⁷ ............................................ G02B 6/34
(52) U.S. Cl. ............................................... 385/37
(58) Field of Search ........................................ 385/37

(56) References Cited

U.S. PATENT DOCUMENTS

| | | | | |
|---|---|---|---|---|
| 3,814,498 A | * | 6/1974 | Tomlinson, III et al. ...... | 350/96 |
| 4,337,993 A | * | 7/1982 | Kompfner ................ | 350/96.19 |
| 5,119,231 A | * | 6/1992 | Nelson et al. ............... | 359/359 |
| 5,442,439 A | * | 8/1995 | Battey et al. ................ | 356/328 |
| 6,141,152 A | * | 10/2000 | Trouchet ...................... | 385/37 |
| 6,263,127 B1 | * | 7/2001 | Dragone et al. ............... | 385/37 |
| 6,304,692 B1 | * | 10/2001 | Sappey et al. ................ | 385/37 |
| 6,404,554 B1 | * | 6/2002 | Lee et al. .................... | 359/576 |

* cited by examiner

Primary Examiner—Michael P. Stefira
Assistant Examiner—Juan D Valentin, II
(74) Attorney, Agent, or Firm—Brinks Hofer Gilson & Lione

(57) ABSTRACT

A volume diffraction grating having a substrate and an optically active layer has a structure formed in the optically active layer. The structure is operational to diffract optical signals in two selected spectral bands. The grating may be formed in a high dispersion embodiment suitable for separating individual signals from composite signals of both spectral bands. Alternatively, the grating may be formed in a low dispersion version which can separate the composite signals from each other. In another embodiment, a second structure is formed in the optically active layer. Each of the structures is configured to be operational in one of the spectral bands, allowing signals in each band to be diffracted independently of one another. In another embodiment, the structure(s) may have a curved profile allowing the diffracted beams to be shaped or focused without the need for external lenses.

18 Claims, 13 Drawing Sheets

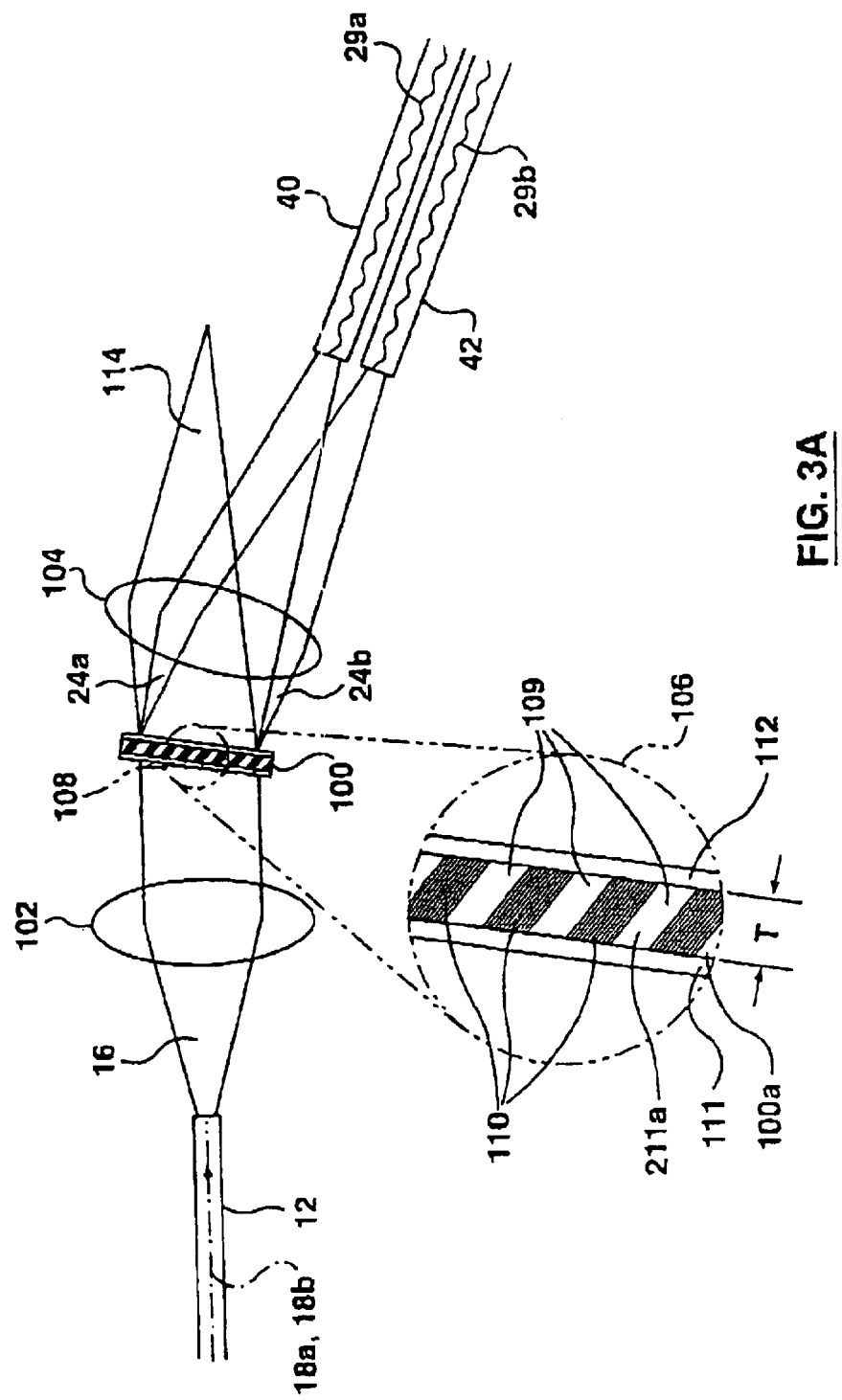

US 6,788,849 B1

VOLUME OR STACKED HOLOGRAPHIC DIFFRACTION GRATINGS FOR WAVELENGTH DIVISION MULTIPLEXING AND SPECTROSCOPY

This application is the U.S. national stage application of International application No. PCT/CA00/01318, filed Nov. 14, 2000, which claims the benefit of U.S. provisional application No. 60/165,309, filed Nov. 12, 1999.

FIELD OF THE INVENTION

This invention relates to wavelength dispersing and combining gratings for spectroscopy and data transmission applications. More particularly, the invention relates to gratings that may be used to multiplex and de-multiplex spectrally separated signals into from a single optic fiber.

BACKGROUND OF THE INVENTION

There exist a number of technical fields (spectroscopy and telecommunications, for example) where it is necessary to spatially separate two or more optical signal which nave different wavelengths or different spectral ranges (or "wave length ranges"). In addition, it is often necessary to perform the reverse operation of combining two or more optical signal having different wavelengths or spectral ranges into a single composite signal which is transmitted by a single optic fiber. The first operation is know as de-multiplexing while the second is known as multiplexing. The entire process is known as Wavelength Division Multiplexing (WDM).

A first example of a situation in which devices are required comes from the field of telecommunications. The operating spectral range of a typical optic fiber is between 1100 nm to 1700 nm, which corresponds to a frequency range of 176 THz to 273 THz. Other fibers have a spectral range which begins as low as 800 nm or even lower. Table 1 is a list of some standardized spectral bands for optic data communication.

TABLE 1

Spectral Ranges, Corresponding Frequencies and Bands

| Spectral [nm] | | RangeFrequency [GHz] | | RangeBand Width |
|---|---|---|---|---|
| From | to | From | To | [THz] |
| 760 | 900 | 390789.5 | 330000.0 | 60.8 |
| 970 | 990 | 306185.6 | 300000.0 | 6.2 |
| 1260 | 1360 | 235714.3 | 218382.4 | 17.3 |
| 1480 | 1600 | 200675.7 | 185625.0 | 15.1 |
| 1600 | 1650 | 185625.0 | 180000.0 | 5.6 |
| 1528 | 1561 | 194117.6 | 189776.4 | 4.3 |

Although some of these bands have a very large bandwidth, it is not possible to generate a single optical signal which can make use of the entire bandwidth of any band. A typical optical signal comprises a data signal which is modulated onto a carrier frequency, which is the center frequency of the optical signal. The highest modulation frequency which has been achieved thus far is in the range of 1 Thz. Practically achievable modulation frequencies are on the order of 100 Ghz. Therefore, if only modulator is applied to produce an optic signal in any of the spectral bands, only a small portion of the available bandwidth would be used. For example, if a signal with 100 GHz bandwidth is transmitted in the band between 1260 nm and 1360 nm, then only about 0.58% of the available band width will be used.

One known solution to this problem is to multiplex multiple signals with different center frequencies into a single optic fiber which has an operating spectral range broader than the spectral range of the band. The spectral range of the band is divided into a number of non-overlapping channels, ach of which is broad enough to allow a single signal to be modulated at desired frequency without extending beyond the spectral range of the channel. A separate optic signal is produced for each channel and the signals are multiplexed into a transmitting end of the optic fiber.

The combined optic signals are thus transmitted on the single optic fiber and at its opposite receiving end, they are de-multiplexed—i.e. they are separated into separate signal which correspond to the original signal produced for each channel.

In addition to multiplexing a set of separate signals which are spectrally spaced in separate channels with a single spectral band to form a composite signal including of the entire set of signals within the spectral band, it is possible to multiplex to or more such composite signals which have sets of signals from different spectral bands. Thus it is possible to form first composite signal having a plurality of separate signals from the spectral band, for example, between 1260 nm and 1360 nm and a second composite signal having a plurality of separate signals from the spectral band, for example, between 1528 nm and 1561 nm. These two composite signals are formed using two independent multiplexing operations. The two composite signals are then multiplexed onto a single fiber, which may be called a "trunk" fiber, in a third multiplexing operation. At the opposite end of the trunk fiber, the two composite signals are first de-multiplexed from one another and then the separate signals forming each composite signal are de-multiplexed in two independent operations to obtain the original optic signals.

To date, the multiplexing and de-multiplexing operations have generally been performed using reflective relief diffraction gratings, which typically consist of a series of lines etched into the surface of a reflective element. Such diffraction gratings may be either high dispersion or low dispersion devices. A high dispersion reflective relief diffraction grating provides sufficient angular separate between signals in adjacent channels in a single spectral band to separate signals in those channels. A low dispersion reflective relief diffraction grating has a narrower angular separation which is suitable for separating spectrally widely spaced composite signals from different spectral bands.

A high dispersion reflective relief diffraction grating cannot generally be used to separate spectrally widely spaced composite signals (or individual signals). Typically, one or both signals will be poorly diffracted or will not be diffracted at all. For example if a high dispersion reflective relief diffraction grating is used as a de-multiplexer and if the incident signal (which contains two composite signals) is positioned such that one of the composite signals is properly diffracted to allow its separate signals to be separated, then the other composite signal will generally be poorly diffracted at an relatively large angle from the first composite signal.

If a low dispersion reflective relief diffraction grating is used to de-multiplex an incident signal contain two composite signal of different spectral bands, then the individual signals in the separate channels of each composite signal will typically not be spaced sufficiently apart to allow them to received by separate recipient optic fibers or detectors Other types of gratings, including fibre Bragg diffraction gratings, free-space gratings and echelle gratings, which are used in spectroscopy applications, suffer from various deficiencies.

SUMMARY OF THE INVENTION

Accordingly, there is a need for an improved diffraction grating for multiplexing and demultiplexing signals having different wavelengths in an optical communication system.

In one aspect, the present invention provides a n optical coupling device for use with first and second composite signals, said first composite signal having a first spectral range and said second composite signal having a second spectral range, said device comprising a volume diffraction grating having: a substrate; an optically active layer mounted to said substrate; and a structure formed in said optically active layer, wherein said structure is operable in said first and second spectral ranges.

In a second aspect, the present invention provides a volume diffraction grating for multiplexing and demultiplexing first and second composite optical signals, said first composite optical signal having a first spectral range and said second composite optical signal having a second spectral range, said grating comprising: a substrate a first optically active element mounted to said substrate; and a first structure formed in said optically active element, wherein said first structure is operable in at least one of said first and second spectral ranges.

In a third aspect, the present invention provides a volume diffraction grating for multiplexing and demultiplexing first and second composite optical signals, said first composite optical signal having a first spectral range and said second composite optical signal having a second spectral range, said grating comprising; a substrate; an optically active element mounted to said substrate; a first structure formed in said optically active element, wherein said first structure is operable in said first spectral range; and a second structure formed in said optically active element, wherein said second structure is operable in said second spectral range.

In another aspect the present invention provides a mean to improve performance of free space devices for combining (multiplexing) spatially separated spectral components into a single light beam and devices for spatial separation (demultiplexing) of multiplicity of spectral components delivered in a form of a single light beam into separate light beams each of them containing single spectral component by applying suitably optimized volume diffraction gratings.

BRIEF DESCRIPTION OF THE DRAWINGS

The present invention will now be explained, by way of example only, with reference to the drawings in which:

FIG. 3A illustrates a low dispersion volume transmission diffraction grating in use in an optical communication system for extracting/combining two separate spectral bands from (into) a single fiber into (from) two fibers;

DETAILED DESCRIPTION OF THE PREFERRED EMBODIMENTS

Figure 1A:
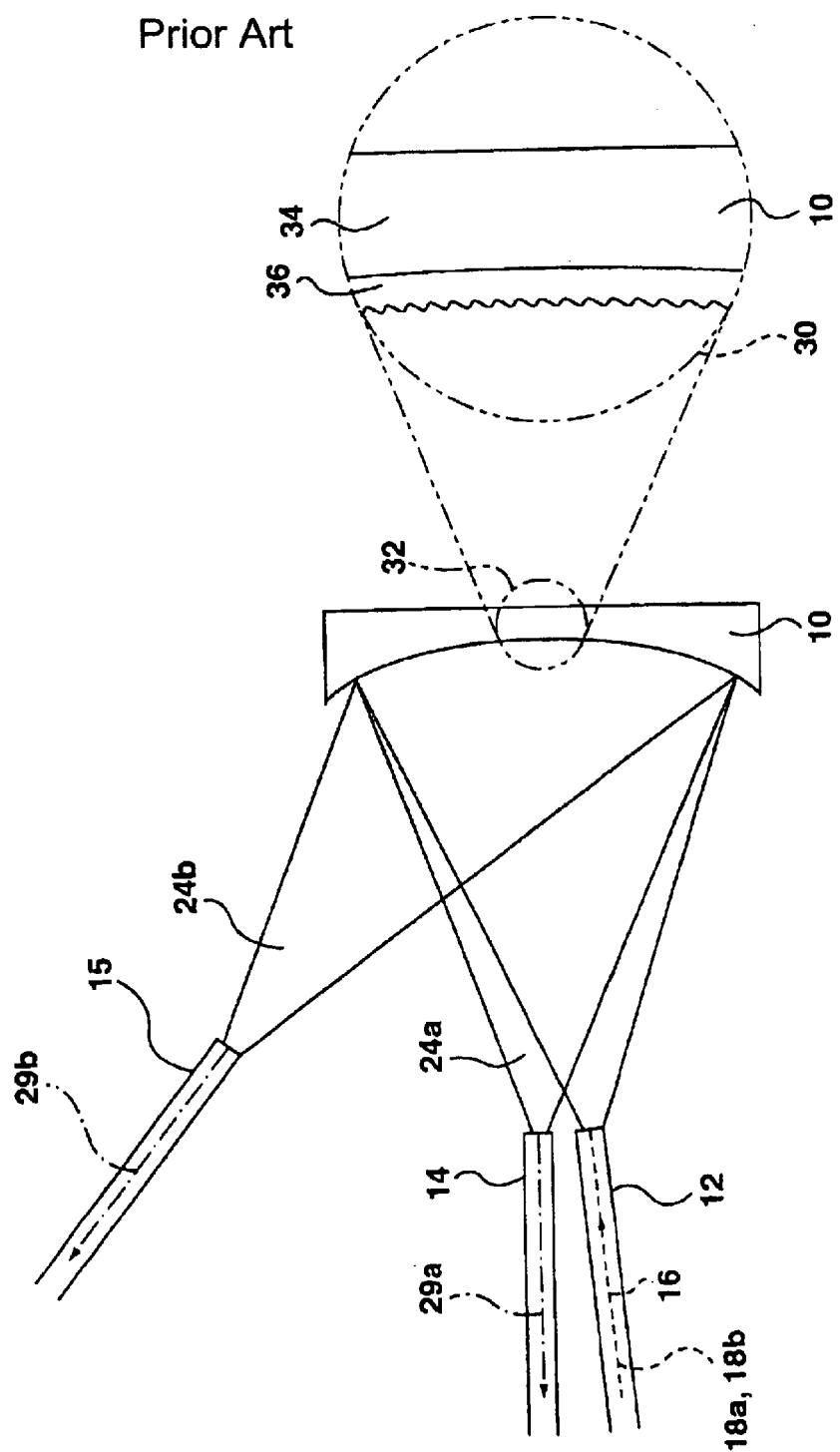
FIG. 1A illustrates a prior art of high dispersion reflecting diffraction grating in use in communication system.

Reference is first made to FIG. 1a, which shows a prior art high dispersion imaging relief reflective diffraction grating 10 intended for use in separating two composite optic signals 18a (with a spectral range of 1528 nm to 1561 nm, for example) and 18b (with a spectral range of 1260 nm to 1360 nm, for example) carried by a single fiber 12, into a first spectral beam 24a and a second spectral beam 24b. The spectral range of optic signal 18a is divided into n channels, each of which carries an individual optical signal, having a unique center wavelength. The n channels may be closely separated (i. e., they may have a separation of 1 nm or less) within the spectral range of optic signal 18a as long as the channels do not overlap. Similarly, optic signal 18b comprises m non-overlapping channels each of which carries a closely separated individual optic signal within the spectral range of optical signal 18b.

Figure 1B:
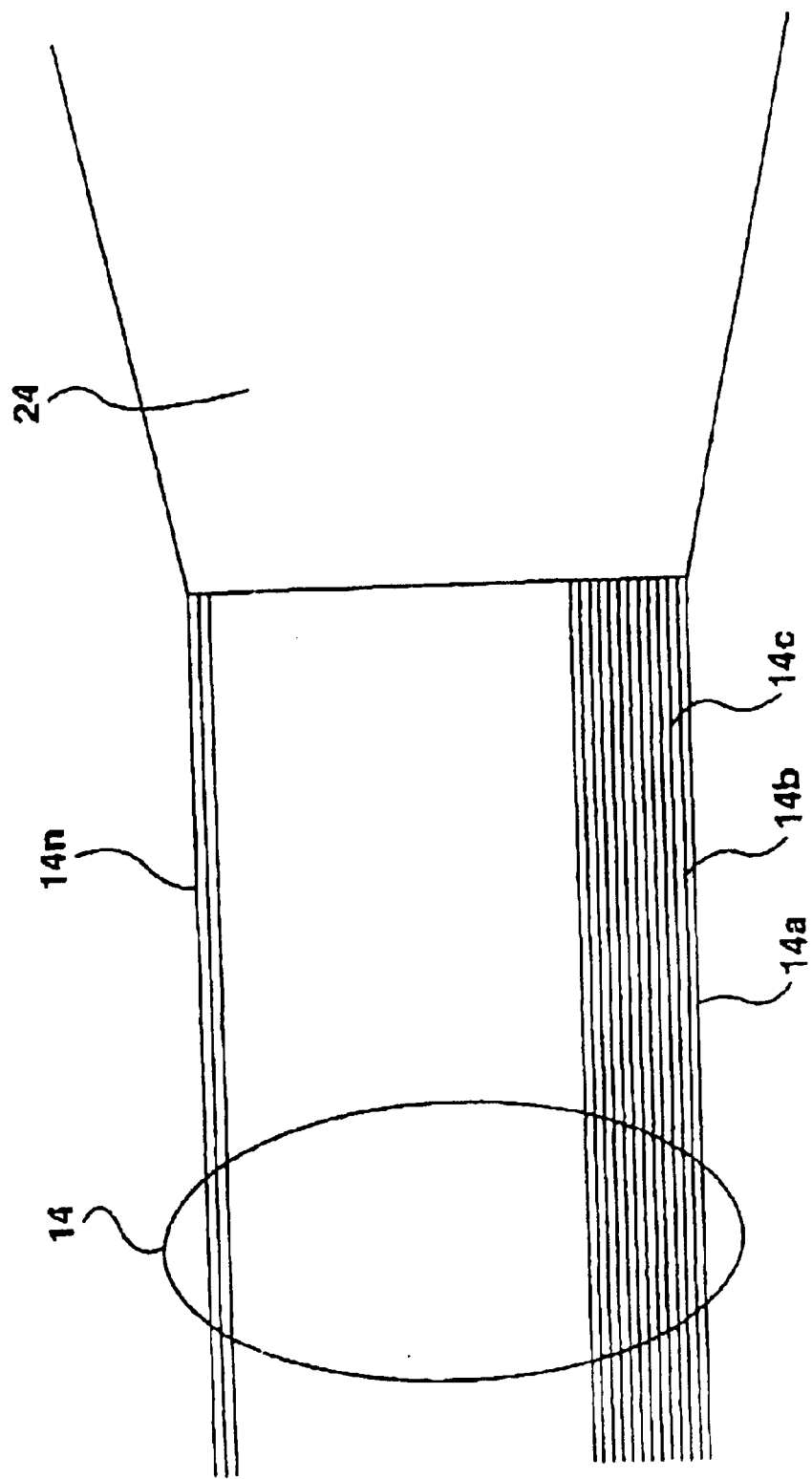
FIG. 1B shows expanded view of trunk fiber bundle containing large number of fiber to collect or deliver large number of telecommunication channels.

Spectral beam 24a corresponds to composite optic signal 18a and is captured as a set of optical signals 29a by a bundle of optic fibers 14, whose structure is shown in FIG. 1b. Spectral beam 24b corresponds to optic signal 18b and is captured as a set of optic signals 29b by a second bundle of optic fibers 15.

Reference is next made to FIG. 1b, which illustrates the first bundle of optic fibers 14 in greater detail. Optic fiber bundle 14 comprises a number of individual optic fibers 14a to 14n. The ends of the optic fibers 14a to 14n are arranged in a linear array to receive spectral beam 24. Individual optic components of spectral beam 24 which correspond to the individual optic signals of composite optic signal 18a will be diffracted at slightly different angles by grating 10 and optic fibers 14a to 14n are positioned to each receive one of those individual components. Optic fiber bundle 15 has a similar structure and comprises a number of individual optic fibers 15a to 15m (not shown), which are similarly positioned to receive individual optic signals that form optic signal 18b.

Reference is again made to FIG. 1a. While it is possible to configure grating 10, which is a nigh dispersion relief reflective grating, to separate, or de-multiplex, one set (spectral beam 24a, for example) of closely separated spectral components within the single relatively narrow spectral band of composite signal 18a with acceptable efficiency and imaging quality, grating 10 cannot practically be used to simultaneously and efficiently separate and image individual channels or optical signals in two spectral bands (i.e. the spectral bands of composite signal 18a and 18b) which are widely spectrally separated from one another. If fiber 12 and fiber bundle 14 are positioned to efficiently separate the individual optical signals which together form composite optical signal 18a, then the spectral beam 24b will be substantially spaced from spectral beam 24a. Spectral beam 24b will generally be diffracted with low efficiency.

One reason for this is that the grating must provide an acceptable angular separation of the individual optic signal in the channels of each spectral band (i.e. spectral beam 24a or 24b) to de-multiplex the closely separated channels into separate receiving fibers (i.e. fiber 14a to 14n). The angular separation of the diffracted spectral beams (24a and 24b) increases proportionally to, dispersion of the grating. The construction of the grating can be optimized to provide a relatively efficient angular spread out of diffracted light in one spectral band individual channels within that spectral band to be separated. The typical structure of grating 10 is shown at 30, which is an expanded view of circle 32. Grating 10 comprises a rigid backing such as glass and a highly reflective layer 36 with suitable periodic microstructure. One skilled in the art will be able to configure the surface of layer 36 to diffract light efficiently in a single spectral band. However, the relatively large separation between the spectral range of two distinct spectral bands renders the same performance in two bands extremely difficult. If the grating is optimized for use with the spectral range of spectral beam 24a, then spectral beam 24b will not be properly diffracted (or may not be diffracted at all). The same is true when one attempts to perform reversed operation to combine two sets of optical channels delivered by set of fibers 14 and 15 from two largely separated optical bands into a single fiber 12. In addition to difficulties related to focusing of largely separated spectral band securing large, polarization independent efficiency is also extremely difficult.

A grating such as grating 10 may be configured to have a low dispersion and therefore provide a smaller and more efficient angular separation between spectral beams 24a and 24b. While this is useful for separating composite signals 18a and 18b from one another, the low dispersion grating cannot sufficiently separate the individual optical signals which form composite signal 18a or composite signal 18b.

The use of prior art grating 10 as to separate spectral components from multi-wavelength signals has several additional disadvantages.

First, the precise position of diffracted beams 24a, 24b is highly dependent on the position of grating 10 which usually is very sensitive to the ambient temperature, changes of which may cause variations of angular orientation of the grating 10. For example, if grating 10 is rotated by x degrees, the position of diffracted beams 24a, 24b will move 2x degrees. Accordingly, it is necessary to position grating 10 precisely relative to trunk fiber 12 and branch fibers 14 and 15.

Second, grating 10 in most cases reflects and diffracts only a portion of the light contained in signals 18a, 18b in a desired direction. Typically, grating 10 will be configured to diffract the largest amount of light signal 18a and 18b into the first diffraction order (i.e. order 1) to form beams 24a and 24b, which in turn form signals 29a and 29b. The remainder of the light in signals 18a, 18b is either partially reflected by grating 10 as by a partially reflecting mirror (diffraction, order 0, not shown) or diffracted in a non-preferred directions (i.e. orders other than order 1, which are also not shown), partially absorbed by grating 10 or scattered. The scattered light corresponding to one signal (i.e. spectral band 24a intended for fiber bundle 14, for example) may be collected by individual fibers in fiber bundle 15, which is intended to collect light is spectral band 24b, causing cross-talk between channels. This may lead to signal deterioration.

Third, the active surface of a reflective diffraction grating, shown as 36 in FIG. 1, cannot be readily protected. The shaping of the active surface is exposed and may easily be soiled or damaged by routine handling. Typically a grating 10 cannot be washed to remove dirt and other contaminants.

Fourth, the efficiency of grating 10 in function of wavelength shows dramatically different performance for s and p polarization. This may lead to significant variations of efficiency when plane polarized light is used and its polarization direction varies.

Figure 2:
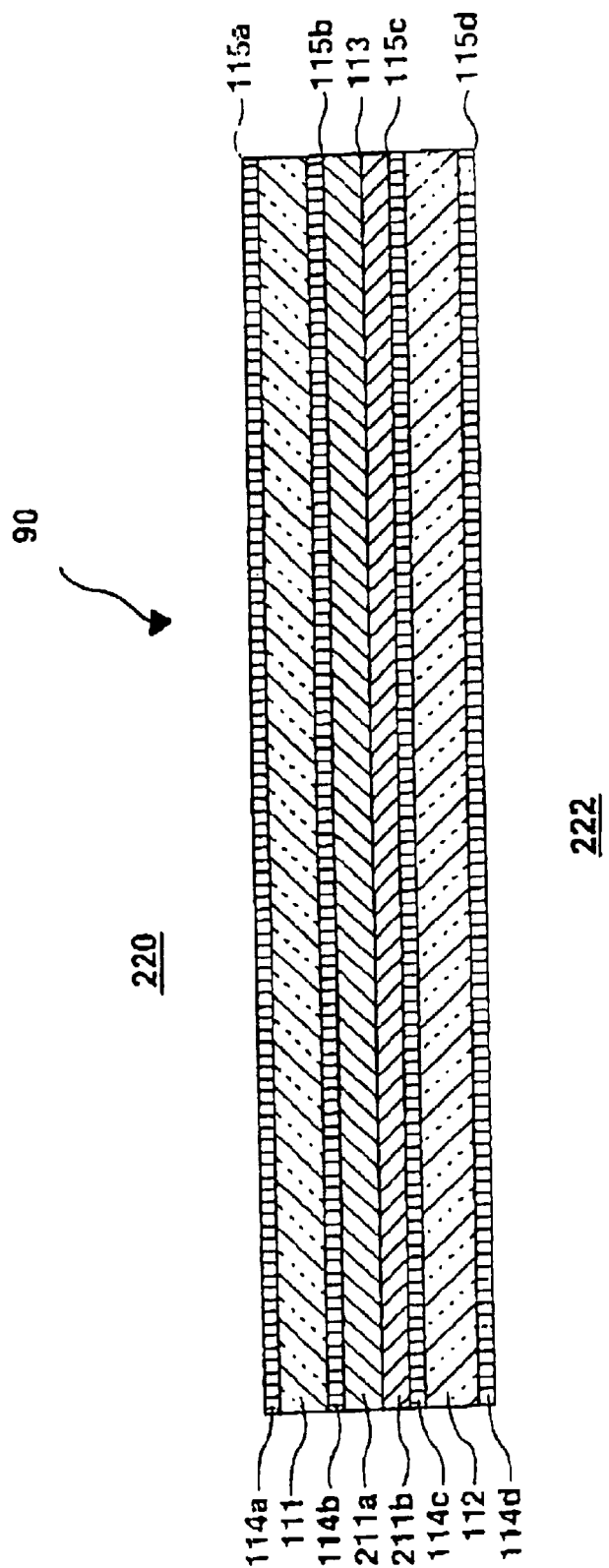
FIG. 2 illustrates one embodiment of a volume diffraction grating in accordance with present invention.

Reference is next made to FIG. 2, which shows a volume diffraction grating 90 in accordance with the present invention. The grating consists of a substrate 111, a cover glass 112, a first active diffraction layer 211a and a second active diffraction layer 211b. Active diffraction layer 211a is formed on one side of substrate 111. Similarly, active diffraction layer 211b is formed on one side of cover glass 112. Active diffraction layer 211a and 212 are cemented together with a layer of optical cement 113.

The diffraction layers 211a, 211b can be configured such that when an incident beam from the half space 220 strikes grating 90, a diffracted beam of a selected diffraction order propagates into the half space 222 which would contain transmitted light if the grating was fully or partially transparent, thus forming a transmissive (or "transmission") diffraction grating. Alternatively, the diffraction layers 211a, 211b may be configured such that when an incident beam from the half space 220 strikes grating 90, a diffracted beam of a selected diffraction order propagates into the half space 220 which would contain reflected light if the grating was fully or partially reflecting, thus forming a reflective diffraction grating.

Diffraction layers 211a, 211b may be formed of a dichromated gelatin or any other material which may be configured to diffract a light signal. If a dichromated gelatin or another optically active material is used, a diffraction grating may be formed by creating alternating regions of high and low refractive index within one or both diffraction layers. This is further described below in relation to diffraction grating 100.

When grating 90 is configured as a reflective diffraction grating, either substrate 111 or cover glass 112 must be made of a material that is transparent in at least the working spectral range. When grating 100 is configured as a transmissive diffraction grating, both substrate 111 and cover glass 112 must be made of material transparent in at least the working spectral range.

Both the substrate 111 and cover glass 112 can be made of filter glass to limit the spectral range of light interacting with the active diffraction layers 211a and 211b. Filter glass can also be used to modify the spectral characteristic of light diffracted by grating 90. Filtering properties of substrate 111 and cover glass 112 can be further enhanced by adding one or more interference fitters 114a, 114b, 114c, 114d produced with thin layer technology (or by another method) on any combination of substrate 111 and cover glass 112 surfaces. For example, if grating 100 is configured as a reflective transmission grating and light is incident on grating 100 from the side of cover glass 112, then interference filters 114c or 114d, or both, may be formed on the surfaces of cover glass 112. If grating 100 is configured as a transmission diffraction grating, then interference filters 114a or 114b, or both may also be formed on the sides of substrate 111. Interference filters 114a, 114b, 114c and 114d may be used to modify the spectrum of diffracted light to compensate for spectral variation of light intensity, spectrally non-uniform response of the detector, or to compensate for spectral non-uniformity of an EDFA (erbium doped fiber optic amplifier) when system used in fiber optics telecommunication system. In addition all or selected surfaces of both substrate and cover glass can be covered with thin layer anti-reflection coating 115a, 115b, 115c and 115d to reduce possible reflection on these surfaces.

Grating 90 has been described in one preferred form. Cover glass 112, the second optically active layer 211b, cement layer 113, interference filters 114a–114d and anti-reflection coatings 115a–115d are optional. In it simplest form, a grating according to the present invention may consist only of a substrate (i.e. substrate 111) with a signal optically active layer (i.e. layer 211a) formed on it. Substrate 111 is required to provide a rigid backing for optically active layer 211a. When it is used, cover glass 112, along with substrate 111, protects grating 100 from damage during handling and cleaning.

Substrate 111 and cover glass 112 have been shown as planar elements. One or both of these elements may have a different shape. For example, either element or both may be a prism or may be curved in order to provide a desired optical function.

Reference is next made to FIGS. 3A, 3B, 3C and 3D, each of which illustrates the use of volume diffraction gratings 100a, 100b, 100c and 100d, each of which is made according to the present invention. Elements of gratings 100a–100d identical to those of grating 90 (FIG. 2) are identified by the same reference numerals. The structure of grating 100a is shown at 106, which is an expanded view of circle 108. Grating 100a comprises a substrate 111, an optically active layer 211a and a cover glass 112.

As noted above, optically active layer 211a may be a layer of a dichromated gelatin or another optically active material. As shown, grating 100a has alternating regions 109 with a higher refractive index and regions 110 a lower refractive index. Alternating regions 109, 110 can take different shapes (including for some applications a planar as shown at 106) and in general they do not have to be perpendicular to the plane of grating 100. In order to function efficiently as a diffractive grating, the position of consecutive regions 109 having an increased refractive index must follow some predefined almost periodic function and in some cases they may become periodic (i.e. equally spaced). These regions must be properly oriented to assure proper performance in required spectral range to be diffracted by grating 100a. The shape and positioning of regions 109, 110 constitutes the "structure" of the grating and this structure controls the grating's operation as a transmissive or reflection grating. In FIG. 3A, grating 100a is configured as a low dispersion transmissive diffraction grating. A person skilled in the art will be capable of forming alternating regions 109 and 110 and of selecting the structure of grating 100a to diffract light of a selected spectral range.

In addition to characteristics of its structure, the efficiency of grating 100a depends on other factors including the thickness T of the optically active layer 211a, the average refractive index of the optically active layer 211a, the magnitude in the difference between the refractive indexes in alternating regions 109 and 111, the way in which the refractive index changes from low to high within a single period (i.e. the sharpness of the transition between regions 109 and 110), and how this transition varies in different regions of the grating. One skilled in the art will recognize that to obtain the required performance of the grating 100 all these parameters must be considered. The diffraction effect is caused by refractive index variation between layers 109 and 110 in optically active layer 211a of the grating (i.e. in the volume of the grating in contrast to the diffraction on the surface as in the case of relief reflection grating 10 (FIG. 1)). For this reason gratings such as grating 90 and 100 are referred to as "volume gratings".

Figure 3B:
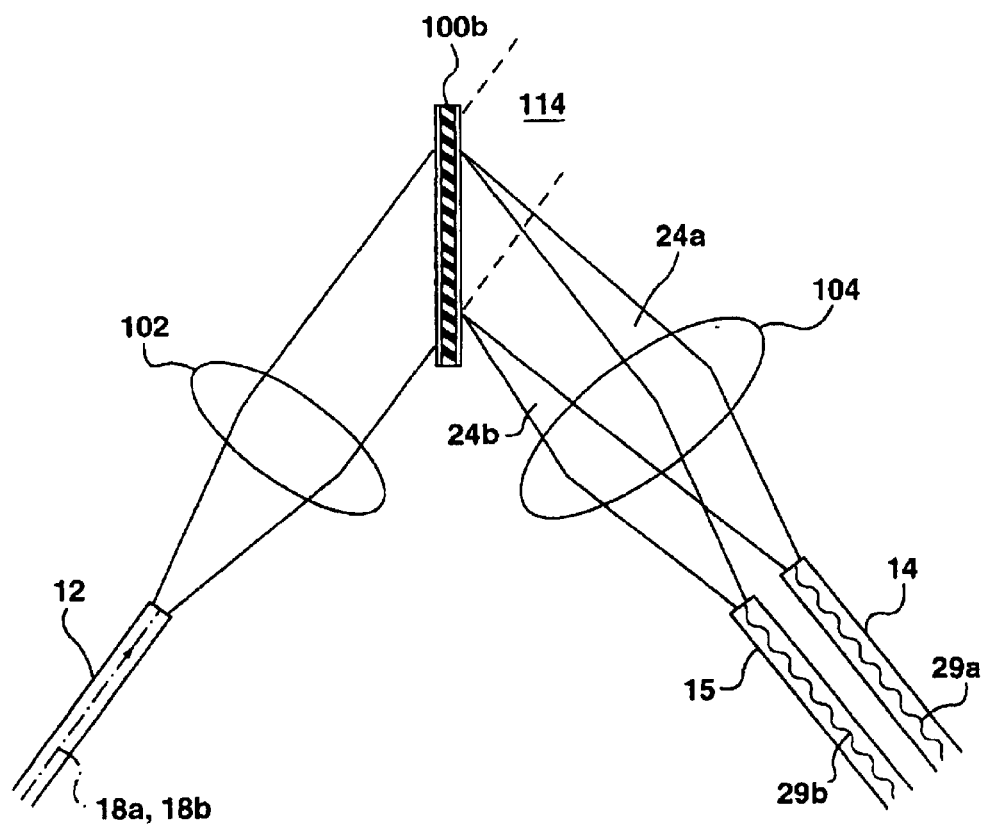
FIG. 3B illustrates a high dispersion volume transmission diffraction grating in use in an optical communication system for extracting/combining of large number of separate channels within a single spectral bands from/into a single fiber and into/from multiplicity of fibers.
Figure 3C:
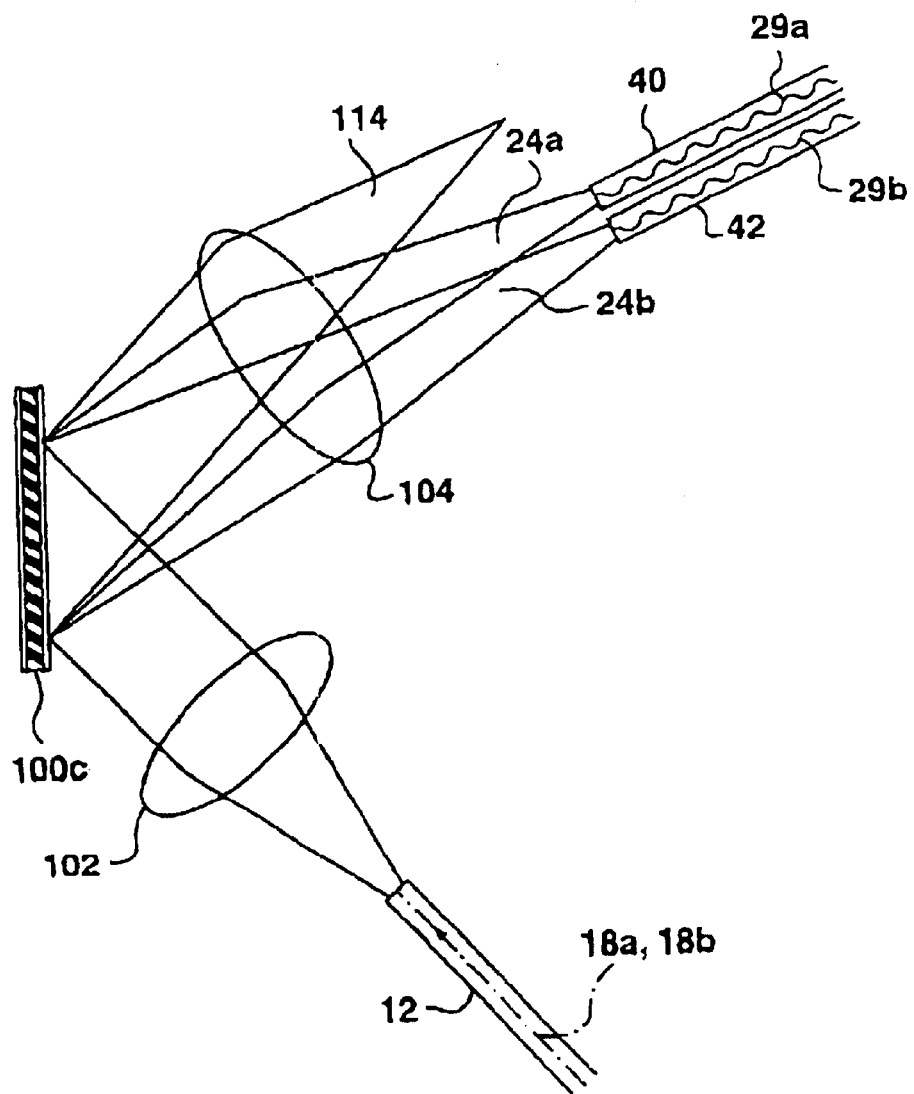
FIG. 3C illustrates another low dispersion volume reflecting diffraction grating for use in an optical communication system for extracting/combining two separate spectral bands from (into) a single fiber into (from) two fibers.
Figure 3D:
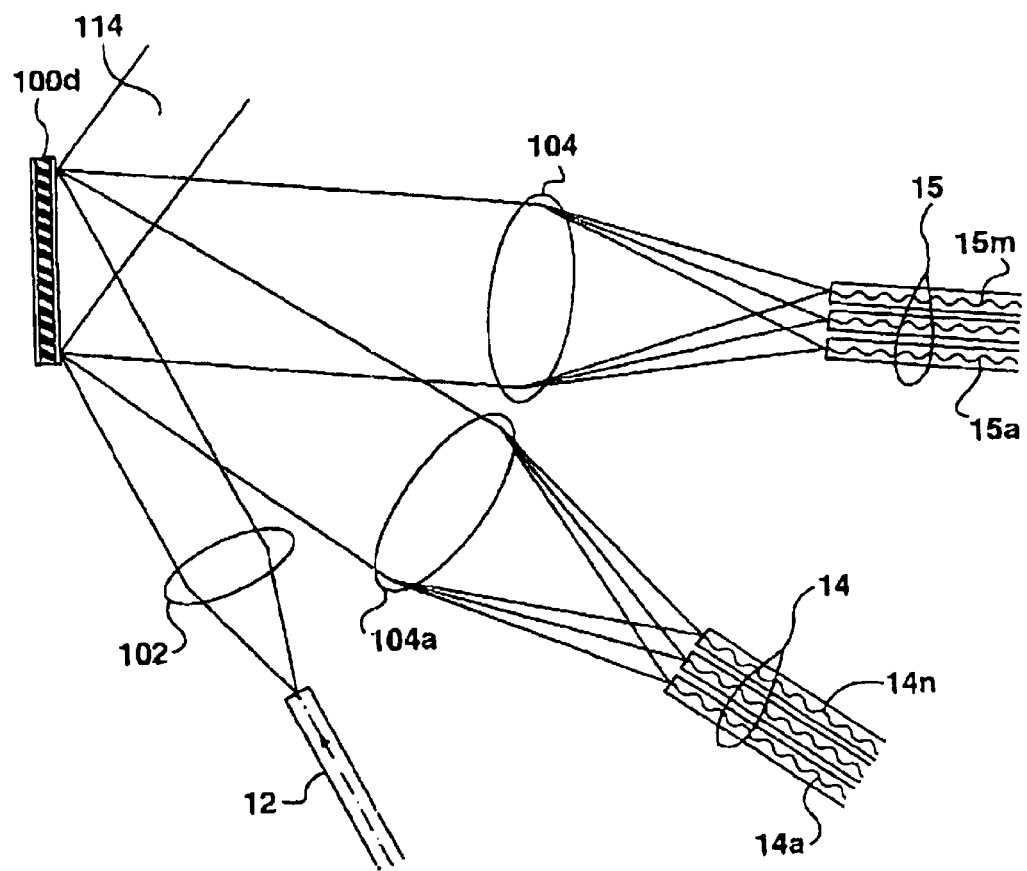
FIG. 3D illustrates another high dispersion volume reflecting diffraction grating in use in an optical communication system for extracting/combining of large number of separate channels within a single spectral bands from/into a single fiber and into/from multiplicity of fibers.

Referring particularly to FIG. 3B signals 18a and 18b are two spectrally spaced sets of composite optic signals, as in FIG. 1. Signal 18a may have a spectral range of 1528 nm to 1561 nm. Signal 18b may have a spectral range from 1260 nm to 1360 nm. (These ranges are only exemplary and in fact other ranges, such as those listed in Table 1, may be used.) Spectral beam 16 exits trunk fiber 12 as a divergent signal that corresponds to both signals 18a and 18b. Spectral beam 16 is collimated by lens 102. The collimated signal strikes grating 100. Grating 100a, like grating 10, diffracts spectral beam 16 into a series of spectral beams, including spectral beams 24a, 24b and 114. Spectral beam 114 is a zero order beam, which will propagate from grating 100 without being diffracted. Spectral beams 24a and 24b are first order diffracted beams corresponding to signals 18a and 18b respectively. Spectral beams 24a and 24b are angularly displaced one from another and correspond respectively to composite signals 18a, 18b. Spectal beam 24a is focused by lens 104 onto fiber bundle 14 (which is comprised of a set of n individual fibers as in FIG. 2) as a set of single wavelength signals 29a corresponding to the set of individual signals which together form composite signal 18a. Similarly, beam 24b is focused by lens 104 onto fiber bundle 15 (which is comprised of a set of m individual fibers) as a set of single wavelength signals 29b which correspond to the set of individual signals which together form composite signal 18b.

By appropriately configuring its structure, a volume grating such as volume grating 90 (FIG. 2) may be configured to provide an efficient high dispersion or low dispersion grating. Furthermore, a volume grating such as volume grating 90 may be configured as a transmissive or reflective grating. The following characteristics of a volume grating such as grating 90 are relevant to its operation as a high or low dispersion grating and as a transmissive or reflective grating:

(i) thickness of active layer;
   (ii) refractive index of active medium of the grating;
   (iii) period of the grating;
   (iv) slant angle of diffraction structure to the surface of the grating;
   (v) modulation depth of refractive index;
   (vi) distribution of refractive index across the diffraction microstructure; and
   (vii) angle of incidence.

A person skilled in the art will be capable of selecting and configuring these characteristics to provide a grating with the desired degree of dispersion and transmissive or reflective characteristics.

FIGS. 3A–3D illustrate several modes of operating a volume diffraction grating. Elements in FIGS. 3A, 3C and 3D which correspond to elements in FIG. 3B and FIG. 1A are given the same reference numerals.

FIGS. 3A and 3B illustrate the use of diffraction gratings 100a and 100b as transmissive diffraction gratings. In particular, grating 100a is a low dispersion grating suitable for separating two composite signals having different spectral ranges (i.e composite signals 18a and 18b) from one fiber (i.e. fiber 12) into two or more fibers 40 and 42.

Grating 100b is configured as a high dispersion grating which is suitable for separating (or combining) individual signals in a two spectral bands into individual fibers in two separate fiber bundle (i.e. fiber bundle 14 (FIG. 2) and fiber bundle 15). By properly configuring the characteristics of grating 100b, the angular separation of spectral beams 24a and 24b may be controlled so that the component signals of composite signal 18a may be efficiently separated from one another while also allowing the components signals of composite signal 18b to be efficiently separated from one another.

Gratings 100c and 100d are reflective gratings which are respectively configured as low and nigh dispersion gratings and operate respectively in a manner analogous to gratings 100a and 100b.

The low dispersion gratings 100a and 100c are designed to be efficient across the spectral range of two spaced bands. This relative position of the fibers which receive the components signals (i.e. sets of signal 18a and 18b) will be determined by the structure of the grating.

The high dispersion gratings 100b and 100d have the advantage that they may be configured to more precisely separate signals within two particular spectral ranges. However, these gratings require more precise configuration than the low dispersion gratings 100a and 100d.

Gratings 100a–100d provide improved performance over grating 10.

First, gratings 100a and 100b are transmissive rather than reflective gratings and are consequently less sensitive to some physical movement of the grating relative to trunk fiber 12 and fibers 40 and 42 or fiber bundles 14 and 15.

Second, as described above, efficiency of the grating 100 by proper selection of thickness of the active layer, its refractive index, range of variation of refractive index and its distribution across the grating, can be much better controlled in terms of its value and spectral characteristics. The internal diffraction efficiency of a properly designed grating 100 may be greater than 99%, far exceeding the efficiency reflective grating available for communication systems. As a result, in addition to stronger signal, the risk of inter-channel cross talk is greatly reduced.

Third, as described above, the surfaces of the grating 100 can easily be protected by a cover glass or other protective material.

Fourth, one skilled in the art will recognize that the efficiency of grating 100 in diffracting a signal 18a, 18b is less sensitive to polarization of the incident signal (i.e. signals 18a, 18b) than relief grating 10.

Fifth, grating 100 may act as either a transmitting or reflecting allowing for different spatial arrangements injecting and collecting fibers. This allows for larger design flexibility of multiplexers and demultiplexers.

Figure 4:
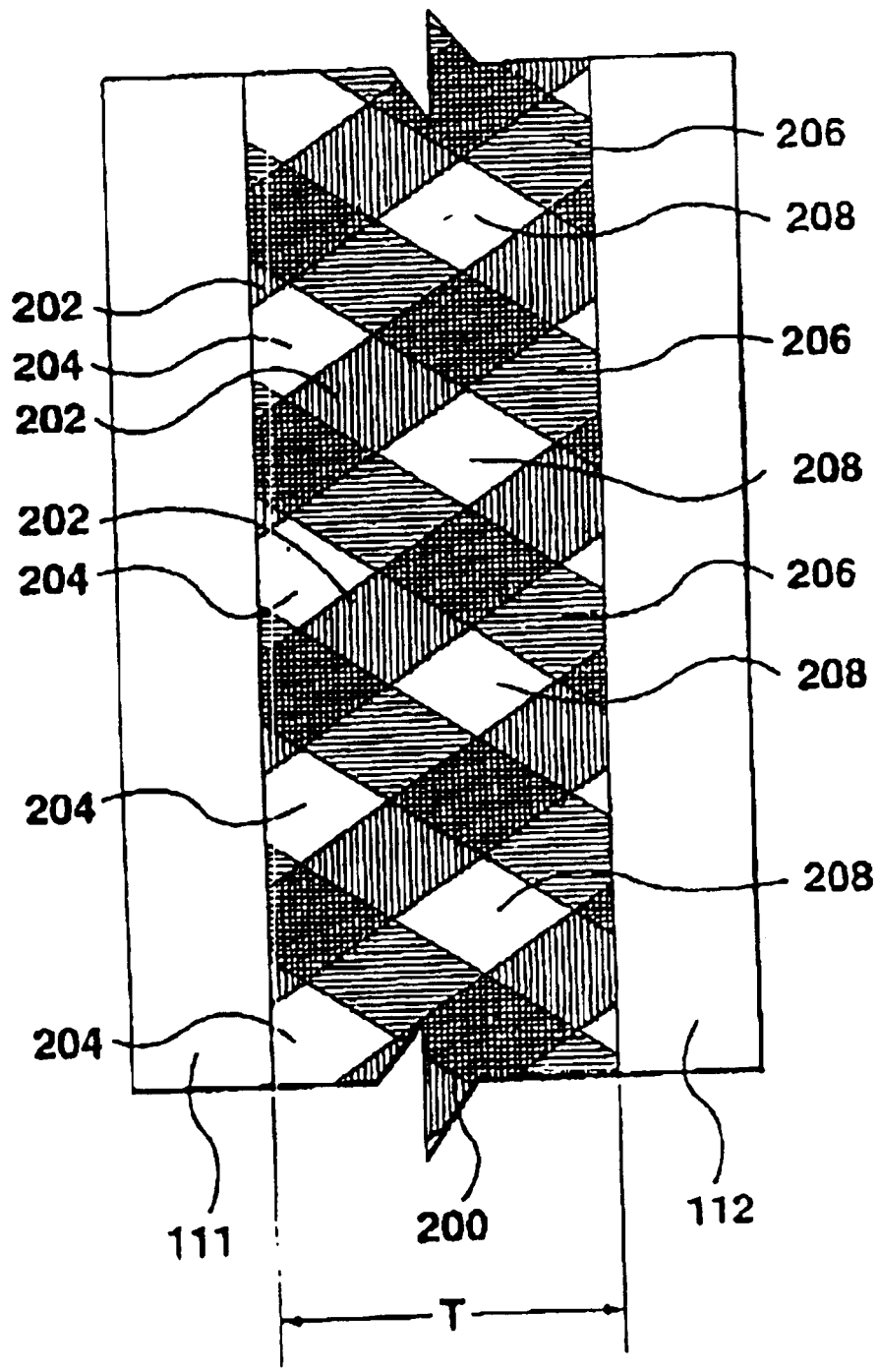
FIG. 4 illustrates another embodiment of a volume transmission diffraction grating with two separate diffraction structures for separate treatment of different spectral bands made according to the present invention.

Reference is next made to FIG. 4, which shows another embodiment of a grating 200 made according to the present invention. Grating,200 is used in the same manner as gratings 100a to 100d (FIGS. 3A to 3D). Grating 200 has two independent structures. A person skilled in the art will be capable of forming two independent structures in grating 200.

The first structure, which consists of regions 202 having a high refractive index and regions 204 having a low refractive index is designed to diffract light in a relatively narrow range including the spectral range of signal 18a. Accordingly, this first structure is configured to have a band pass characteristic that diffracts light in the wavelength range for example between approximately 1528 nm to 1561 nm.

The second structure consists of regions 206 having a high refractive index and regions 208 having a low refractive index and has a band pass characteristic that diffracts light in the spectral range of signal 18b, between 1260 nm and 1360 nm. All parameters of two separate diffraction structures like their period, refractive index modulation depths and distributions of refractive index across the period and across the grating can be different to independently achieve the best performance in each spectal band.

In operation, grating 200 is used in the same manner as grating 100a, as shown in FIG. 3B. The first and second structures of grating 200 will operate independently of one another to diffract the portions of spectral beam 16 corresponding to signal 18a and 18b respectively. Compared to grating 100, grating 200 has the advantage that both its structures may be configured as high dispersion gratings which operate in a single spectral range, and therefore each structure may be formed to provide a more precise diffraction of spectral beams in its respective spectral range.

Although grating 200 has only two structures, in practice, a grating may have many more structures embedded into it to allow many different sets of signals each having a different spectral range to be resolved. The operation of each structure will be independent of the others, so long as the thickness T of the grating is sufficient (i.e. the volume of grating 200 is sufficient). One skilled in the art will be capable of selecting a sufficient thickness T to ensure the independent operation of the two structures.

Similarly, if a volume diffractive grating consists of two cemented active layers like grating 90 (FIG. 2), each layer may contain more than one diffraction structure, performing separate tasks. This even further expands capability of the present invention, allowing for the production of diffractive elements with very complex functions.

FIGS. 5A, 5B, 5C and 5D illustrate additional embodiment of volume diffraction gratings with two structures, like grating 200.

Figure 5A:
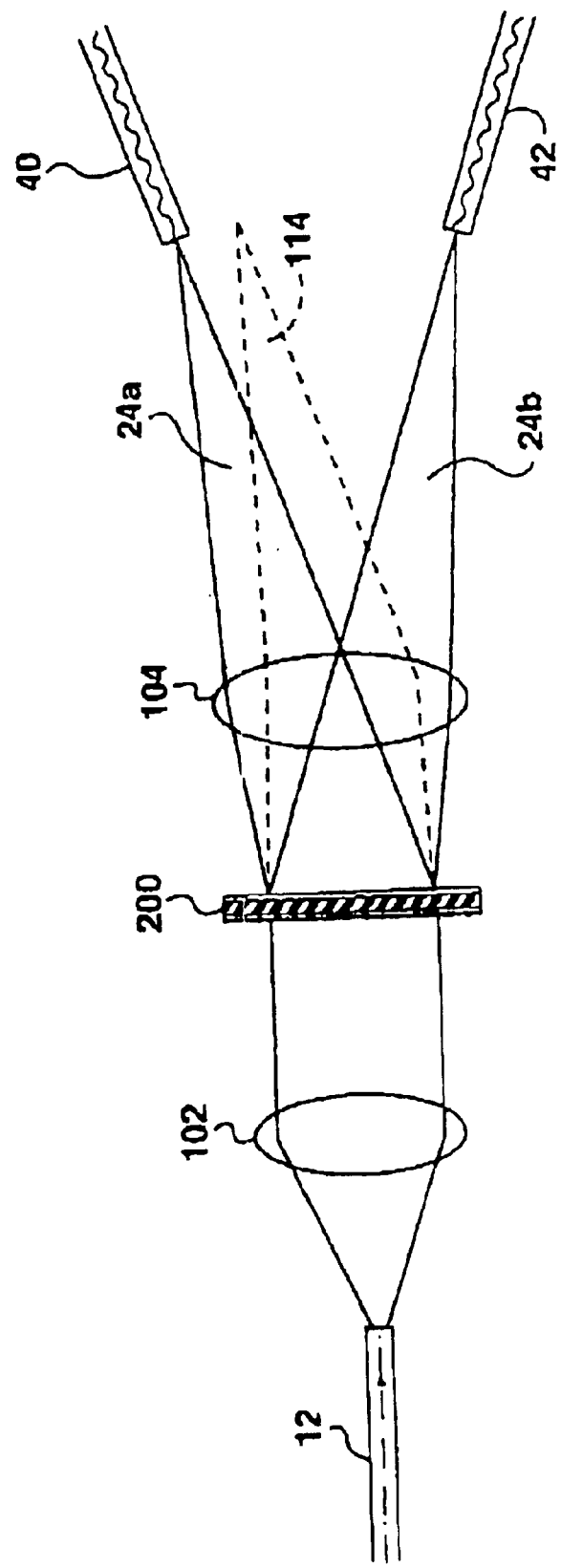
FIGS. 5A, 5B, 5C and 5D illustrates volume transmission diffraction grating according to the present invention with incorporate two or more structures.
Figure 5B:
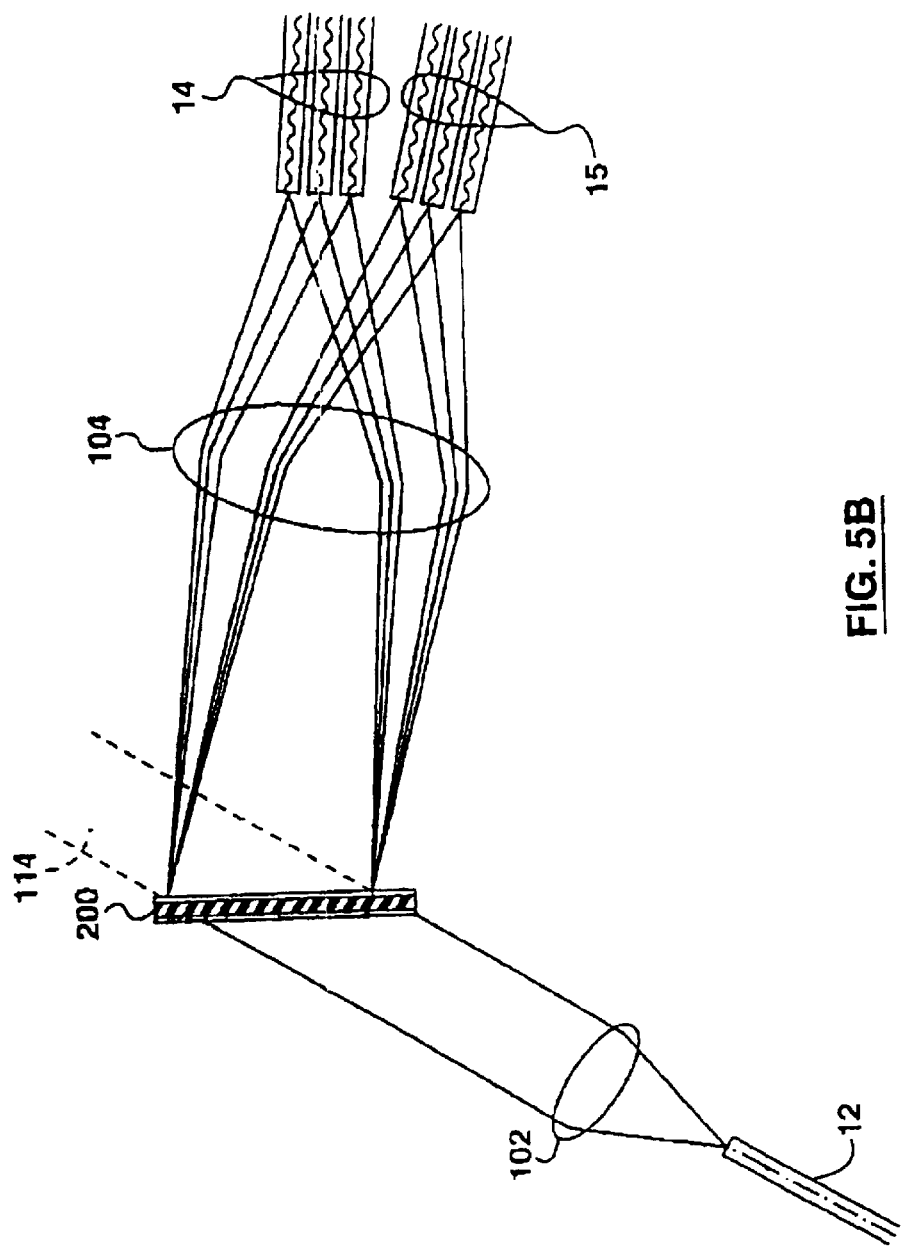

FIG. 5A illustrates the application of low dispersion volume transmissive grating 200a with two independent diffraction structures for separation or combining of two separate spectral bands, while FIG. 5B shows application of a high dispersion grating 200b with two independent diffraction structures for independent control of diffraction geometry of both spectral bands and simultaneously for separation of telecommunication channels within each band.

Figure 5C:
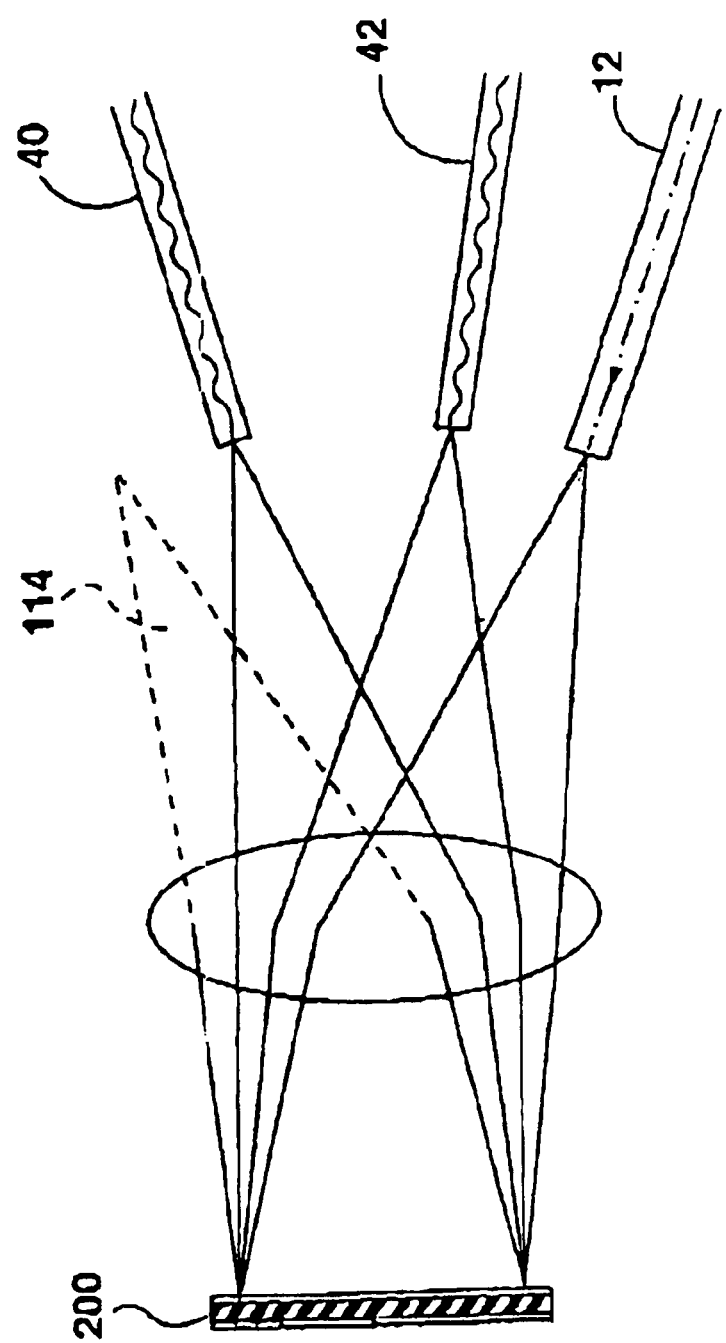
Figure 5D:
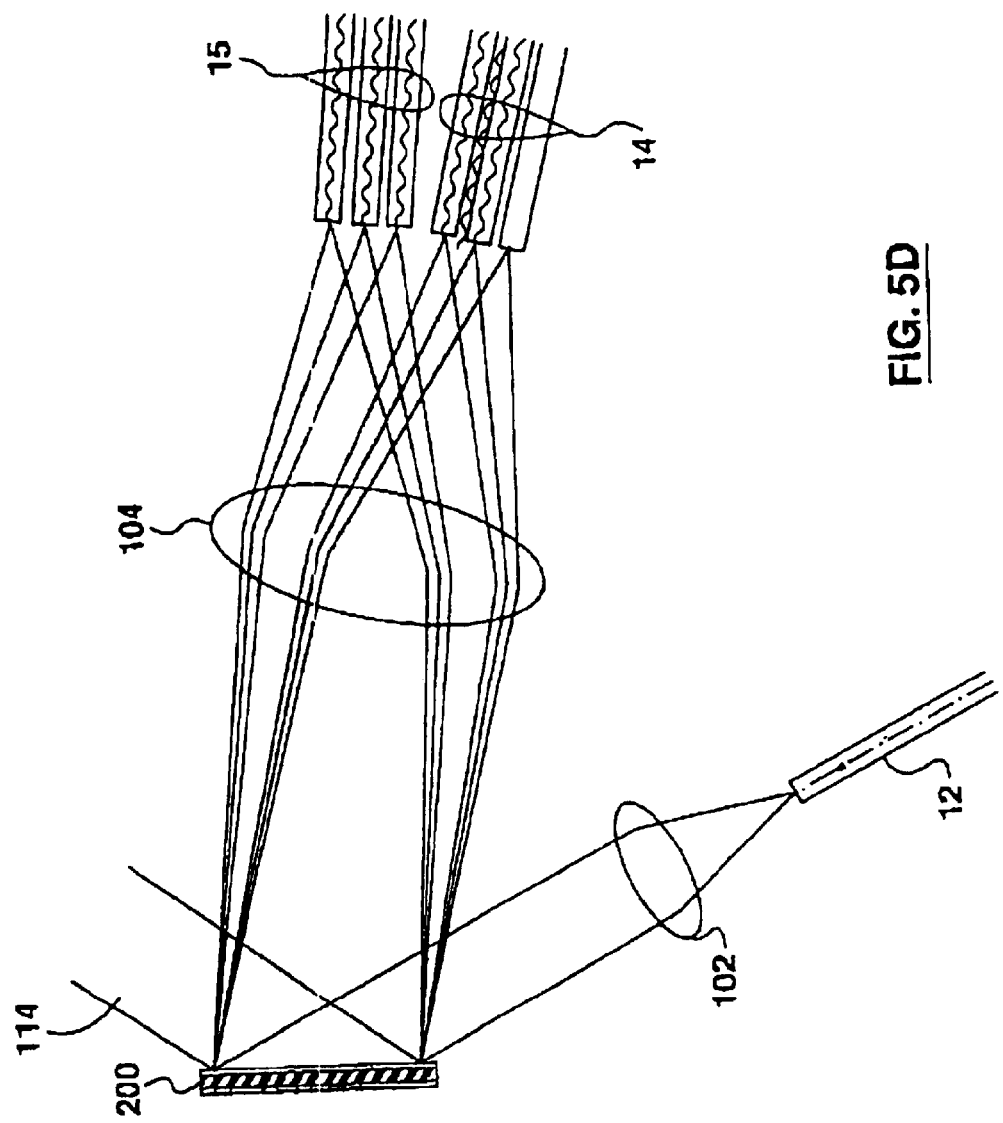

FIGS. 5C 5D show reflective volume diffraction grating with two structures performing the same functions, respectively, as transmitting gratings 200a and 200b in FIGS. 5A and 5B.

When the structure of a grating is configured to operate in a relatively narrow range, it may be made more efficient. That is, if one of gratings 200a–200d is used in the place of grating 10, more of the incident light from signal 16 that strikes grating 200 within the specific band pass ranges of the two structures will be diffracted and transmitted through lens 104 onto branch fibers 14, 15. The internal efficiency (efficiency in relation to light entering diffraction structure, Which may be lower than total incident light because of possible light losses on the surface of the grating) may approach 100% for each structure in gratings 200a–200d, depending on the characteristics of the grating. Accordingly, the risk of inter-channel cross talk is reduced even further compared with grating 10. In the case described above wit reference to FIG. 1b, where each of fibers 14, 15 actually carry a number of signals and are comprised of a number of fibers, then the corresponding of grating 200 must be designed to diffract wavelengths through the relevant range.

Another benefit of gratings 200a–200d is that light outside of designed working ranges of the two structures, which are configured to operate in the spectral ranges of signal 18a and 18b, will not diffract light outside of these spectral ranges. Such light might be produced by some nearby light source and grating 200a–200d may also acts as a noise filter to reduce the transmission of such transient light.

Figure 6:
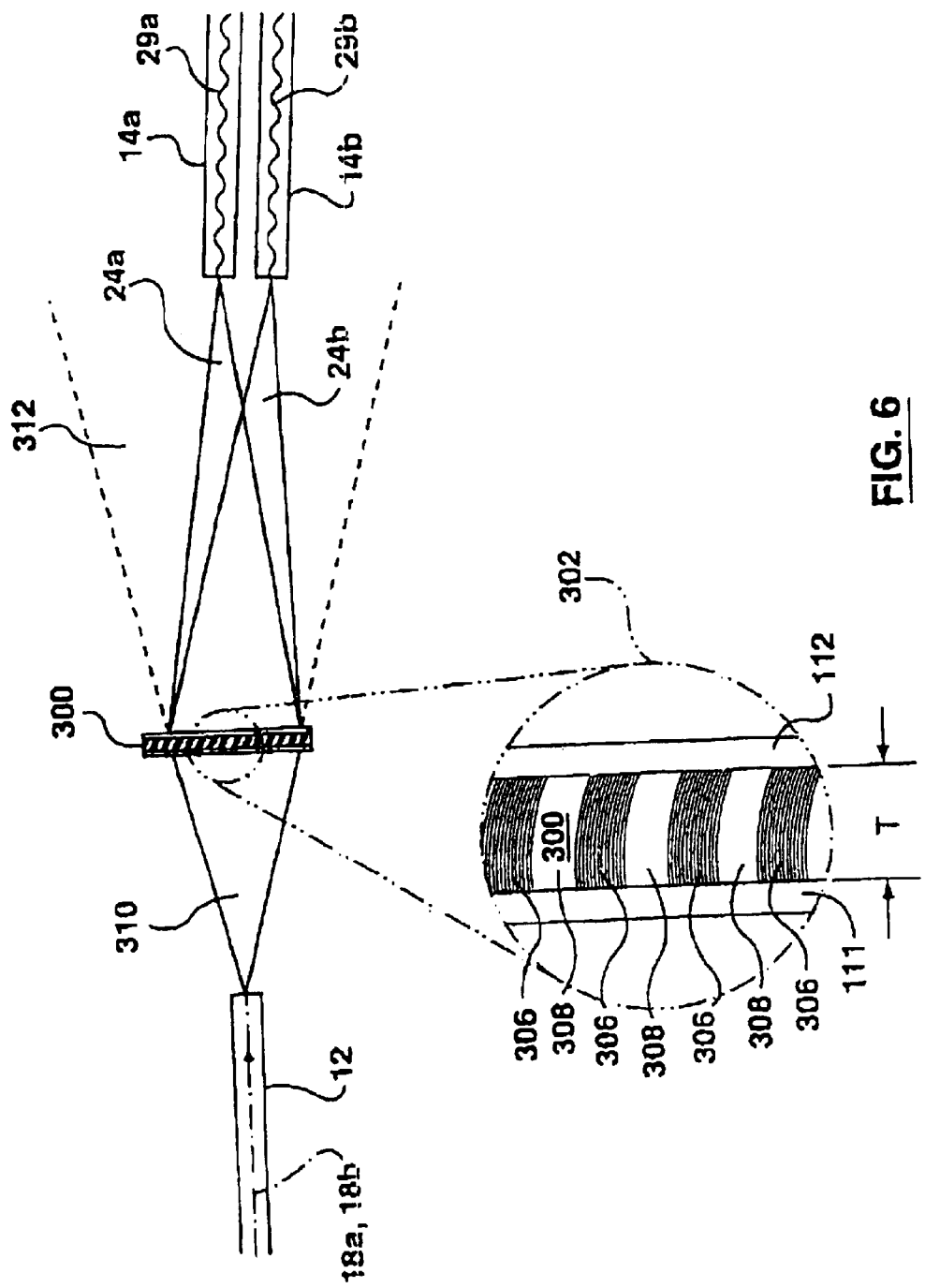
FIG. 6 illustrates a volume transmission diffraction grating according to the present invention with focusing power implemented into grating.

Reference is next made to FIG. 6, which shows another embodiment of a volume transmission diffraction grating 300 according to the present invention. Grating 300 has a single structure shown more clearly at 302, which is an enlarged view of circle 304. As shown, grating 300 has regions 306 with a high refractive index and regions 308 with a low refractive index. The alternating regions have a curved rather a planar cross-section, in contrast to the structure of gratings 100 and 200. The shaping of regions 302 and 304 acts to modify the shape of diffracted beams 24a, 24b (which, as above are the first order diffracted beams corresponding to signals 18a, 18b).

Signals 18a, 18b are transmitted along trunk fiber 12 and exit in a divergent beam 310. Divergent beam 310 strikes grating 300, which diffracts light across a range of wavelengths including the wavelength of signals 18a, 18b, which are components of signal 16, as above. The structure of grating 300 is selected to focus the first order of diffracted beams 24a, 24b corresponding to signals 18a, 18b respectively onto branch fibers 14, 15. Grating 300 does not focus the zero order beams 312 for either wavelength.

Grating 300 provides the advantage that lenses 102 and 104 are not required to collimate signal 16 and to focus beams 24a, 24b. Grating 300 also provides the other advantages of grating 100 of FIG. 2 over grating 10 of FIG. 1.

In another embodiment (not shown) of a grating according to the present invention, the advantages of grating 300 may be combined with the noise filtering and high efficiency advantages of grating 200 by making Two structures in the grating. One of the structures may have a relatively narrow pass band in the spectral range of signal 18a and may be configured to focus the first order diffracted bean 24a. Similarly, the other structure may have a narrow pass band in the spectral range of signal 18b and may focus the first order diffracted signal 24b.

Although these preferred embodiments of the present invention have been described with reference to separating (or demultiplexing) several signals having different wavelengths from a pair of composite signals (18a and 18b), the embodiments are equally capable of being used to combine (or multiplex) several individual signals in two different spectral bands into a pair of composite signals which are transmitted on a single trunk fiber. combined multiwavelength signal.

The embodiments described may be modified and varied without departing from the scope of the present invention, which is limited only by the following claims.

What is claimed is:

1. An optical coupling device for use with a beam of electromagnetic radiation comprising two, or more than two composite signals, said device comprising a volume diffraction grating having a substrate, and one, or more than one optically active layer attached to said substrate, said one, or more than one optically active layer separating and dispersing said two, or more than two composite signals, characterized in that each one of said one, or more than one optically active layer comprises two, or more than two intersecting diffraction structures, each one of said two, or more than two intersecting diffraction structures having a specific periodic modulation of refractive index.

2. The device of claim 1, wherein each one of said one, or more than one optically active layer comprises two diffraction structures.

3. The device of claim 1, wherein each one of said one, or more than one optically active layer comprises three diffraction structures.

4. The device of claim 1, wherein each one of said one, or more than one optically active layer comprises four diffraction structures.

5. The device of claim 1, wherein said volume diffraction grating comprises one optically active layer.

6. The device of claim 1, wherein said volume diffraction grating comprises two optically active layers.

7. The device of claim 1, wherein said volume diffraction grating comprises two, or more than two optically active layers, and said device further comprises one, or more than one optically transparent cement layer cementing said two, or more than two optically active layers together.

8. The device of claim 7, further comprising a cover glass, wherein said two, or more than two optically active layers are positioned between said substrate and said cover glass.

9. The device of claim 1, further comprising a thin layer filter coating on one or both sides of said substrate, said thin layer filter coating modifying the spectral content of one, or more than one of said two, or more than two composite signals.

10. The device of claim 1, wherein said substrate is formed of optical filter glass, said optical filter glass being transparent in one, or more than one spectral range of said two, or more than two composite signals.

11. The device of claim 8, wherein said cover glass is non-transparent in one, or more than one spectral range of said two, or more than two composite signals.

12. The device of claim 1, wherein said two, or more than two intersecting structures have a curved configuration.

13. The device of claim 1, wherein said two, or more than two composite signals comprise a first composite signal and a second composite signal, and said one, or more than one optically active layer comprises a first optically active layer, and a second optically active layer, each one of said first and second optically active layers comprising two, or more than two intersecting diffraction structures, said first optically active layer separating and dispersing said first composite signal, and said second optically active layer separating and dispersing said second composite signal.

14. The device of claim 1, further comprising an incident lens for receiving said two, or more than two composite signals and for providing a collimated beam containing two, or more than two collimated composite signals, said collimated beam being incident on said volume diffraction grating.

15. The device of claim 1, further comprising a focusing lens for receiving two, or more than two diffracted spectral beams comprising composite signals and for focusing said two, or more than two diffracted spectral beams onto two, or more than two sets of receiving elements.

16. The device of claim 15, wherein said two, or more than two sets of receiving elements comprise two, or more than two sets of receiving optic fibers.

17. The device of claim 1, wherein said volume diffraction grating is configured:
   (i) to receive an incident beam containing two, or more than two composite signals, and
   (ii) to diffract said two, or more than two composite signals to a set of two, or more than two detectors.

18. The device of claim 1, wherein said two, or more than two composite signals comprises a first composite signal, and a second composite signal, said first composite signal having a first spectral range, and said second composite signal having a second spectral range, wherein said first composite signal has a first set of closely separated component signals within said first spectral range and said second composite signal has a second set of closely separated component signals within said second spectral range, and wherein said volume diffraction grating is configured to diffract each of said component signals in said first set of closely separated component signals into one fiber in a first set of receiving fibers, and to diffract each of said component signals in said second set of closely separated component signals into one fiber in a second set of receiving fibers.

* * * * *

UNITED STATES PATENT AND TRADEMARK OFFICE
CERTIFICATE OF CORRECTION

PATENT NO. : 6,788,849 B1 Page 1 of 1
DATED : September 7, 2004
INVENTOR(S) : Romuald Pawluczyk It is certified that error appears in the above-identified patent and that said Letters Patent is hereby corrected as shown below:

<u>Title page,</u>
Item [73], Assignee, delete "CME Telemetrix Inc., Waterloo (CA)".

Signed and Sealed this

Twenty-third Day of May, 2006

JON W. DUDAS
*Director of the United States Patent and Trademark Office*